Patented Aug. 22, 1950

2,520,015

UNITED STATES PATENT OFFICE 2,520,015

ACID ADDITION SALTS OF 1-CYCLOPENTYL-2-METHYL-AMINO PROPANE COMPOUNDS AND VASOCONSTRICTOR COMPOSITIONS THEREOF

Ewald Rohrmann, Indianapolis, Ind., assignor to Eli Lilly and Company, Indianapolis, Ind., a corporation of Indiana No Drawing. Application January 5, 1948, Serial No. 645

12 Claims. (Cl. 167—65)

My invention relates to highly effective vasoconstrictive compositions embodying novel chemical compounds.

Ephedrine, amphetamine and like compounds have long been used as vasoconstrictive agents and have been found to be of great value in producing a therapeutically desirable vasoconstriction. However, therapeutic administration of these compounds has been attended with the production of undesirable side effects which tend to diminish their usefulness. Thus for example, both ephedrine and amphetamine strongly stimulate the central nervous system, and in addition, may cause a secondary vasodilatation which more than offsets the beneficial vasoconstrictive action. Numerous attempts have been made to produce compositions which would evoke the high vasoconstrictive response of ephedrine and amphetamine but which would not also give rise to their undesirable side reactions. Compounds substantially free from central nervous system stimulation and secondary vasodilatation have been produced, such compounds being of the class of straight and branched-chain aminoalkanes, for example, 2 - aminoheptane, 2 - amino-4-methylhexane and the like. These last compounds, however, while they produce adequate and effective vasoconstriction in parenteral and topical application, unfortunately possess the inherent disadvantages of showing only a substantially diminished pressor effect when administered orally.

Objects of my invention are to provide vasoconstrictor compositions of high therapeutic efficiency, which are free from the undesirable side effects produced by ephedrine and amphetamine-containing compositions, which exert a long-lasting vasoconstrictive action, and which, unlike the compositions containing straight and branched-chain aminoalkanes, evoke a strong vasoconstrictive response when administered orally, as well as when administered parenterally or topically. Other objects will be apparent from the following description of my invention.

In pursuance of the above and other objects I have discovered novel chemical compounds comprising 1 - cyclopentyl - 2 - methylaminopropane and its acid addition salts, and have provided compositions embodying those novel chemical compounds, which possess the sought for and desirable vasoconstrictive properties.

My compositions embodying 1-cyclopentyl-2-methylamino-propane and its salts not only exhibit the desirable properties of ephedrine and amphetamine but exhibit those properties to an even greater extent than ephedrine and amphetamine. Moreover, 1-cyclopentyl - 2 - methylaminopropane and its salts in suitable preparations show no appreciable stimulation of the central nervous system, nor do they manifest the secondary vasodilatation effect which not infrequently appears after administration of ephedrine and amphetamine compositions. Furthermore, preparations containing 1-cyclopentyl-2-methylaminopropane and its salts are highly efficient when administered orally as well as when given parenterally or topically, thus providing a wide range of modes of therapeutic application. Additionally, 1-cyclopentyl-2-methylaminopropane and its carbon dioxide addition salts, e. g., carbonates and carbamates, are volatile, and in combination with suitable ingredients may be employed in vapor inhalant devices to produce effective decongestion of the nasal passages.

Therapeutic compositions in accordance with this invention comprise 1-cyclopentyl-2-methylaminopropane or an acid addition salt thereof in combination with an extending medium. The compositions may be of several forms, the form chosen being one adapted to the desired mode of administration. By way of illustration, for oral use a salt of 1-cyclopentyl-2-methylaminopropane may be combined with an extending medium comprising one or more solid excipients and administered in solid form as a tablet or a capsule, or alternatively, the amine base or one of its salts may be dispersed in a liquid extending medium and administered as an aqueous suspension or solution, or an elixir. For parenteral administration, water, or preferably, a water solution containing buffering agents, isotonicity-imparting or other ingredients may be employed as the extending medium, although other suitable liquids, for example propylene glycol and the like, may be used. Desirably the amino compound is incorporated in such compositions in the form of one of its soluble acid addition salts, e. g., the hydrochloric, hydrobromic or maleic acid addition salt. For topical administration, such as application to the nasal passages, there are employed extending media which with 1-cyclopentyl-2-methylaminopropane or its salts will produce bland aqueous or oleaginous compositions compatible with the nasal mucosa.

For parenteral and topical application, dilute liquid dispersions, i. e. solutions or suspensions of 1-cyclopentyl-2-methylaminopropane or its salts, may be employed. Concentrations of 1-cyclopentyl-2-methylaminopropane or a salt thereof in effective amounts up to about 5 percent (weight-volume) are suitable, but concentrations of about 0.5 to about 2 percent are preferred. When concentrations of the amine salt less than about 1 percent are employed, desirably there is present in the solution an amount of salt or other isotonicity-imparting ingredient. However, water solutions of the amine salt having a concentration of about 1 to about 5 percent are sufficiently isotonic to provide a medicament which causes no stinging or other unpleasant effects when applied to mucous membrane or other sensitive tissue.

In a broad sense, for the purposes of this invention, extending media are physiologically compatible media, that is, they neither by themselves nor in combination with the 1-cyclopentyl-2-methylaminopropane produce any untoward effect upon the tissues with which they come in contact in therapeutic administration. As disclosed hereinabove, extending media useful in preparing therapeutic compositions may be solids or liquids. Solid extending media include excipients such as starch or milk sugar, and for tableting purposes include binders, such as magnesium stearate. Liquid-extending media may be aqueous or oleaginous. Suitable aqueous extending media include water and water-miscible materials. Thus the extending medium may be water alone, or water solutions containing isotonicity-imparting ingredients, e. g. sodium chloride, sodium hydrogen phosphate, glucose, lactose and the like, and may contain other ingredients which are primarily thickening agents, for example methylcellulose, agar, sodium algenate, etc. Agents which may be incorporated in the extending media include ethylidene glycerol, propylene glycol and the like. Oleaginous extending media comprise oils such as petrolatum, cottonseed and peanut oils. Emulsions of aqueous and oleaginous media may be employed if desired. In compositions such as those prepared for parenteral application and for topical application to sensitive tissues such as nasal mucous membrane, the extending media serve to produce bland solutions compatible with the sensitive tissues with which the compositions come in contact.

Therapeutic compositions illustrative of forms in which my novel 1-cyclopentyl-2-methylaminopropane and its salts may be administered are as follows:

A composition suitable for parenteral administration may be compounded from the following ingredients in the following proportions:

1 - cyclopentyl-2-methylaminopropane sulfate _____g__ 10
Water, q. s_____ml__ 500

An alternative composition suitable for parenteral administration may be as follows:

1 - cyclopentyl-2-methylaminopropane hydrochloride _____g__ 2.0
Potassium dihydrogen phosphate_____g__ 0.68
Water, q. s_____ml__ 100

A jelly suitable for topical administration may be prepared according to the following:

1 - cyclopentyl-2-methylaminopropane sulfate _____g__ 1.0
Glycerin _____g__ 15.0
Gum tragacanth _____g__ 1.0
Methyl salicylate_____g__ 0.01
Sodium phosphate_____g__ 0.20
Water to make_____ml__ 100

An inhalant composition suitable for use in an inhalant device comprises the following:

1 - cyclopentyl-2-methylaminopropane carbonate _____g__ 100
Oil of ylang ylang_____g__ 1.5
Menthol _____g__ 2.0
Propylene glycol, q. s_____cc__ 200

A composition suitable for topical application to the nasal mucosa is as follows:

1 - cyclopentyl-2-methylaminopropane hydrochloride _____g__ 1.0
Sodium chloride_____g__ 0.9
Sodium dihydrogen phosphate_____g__ 0.6
Water, q. s_____cc__ 100

In addition to the above mentioned compositions other similar mixtures may be prepared. If desired, other active therapeutic ingredients may be incorporated. For example, compositions may be prepared which comprise 1-cyclopentyl-2-methylaminopropane or a salt thereof and a local anesthetic, or a sulfa drug, e. g. sulfathiazole, sulfadiazine and the like.

Compositions containing 1 - cyclopentyl - 2-methylaminopropane and its acid addition salts possess a potency superior to other well known vasoconstrictive agents, and analogous compounds. The comparative pressor effect on pithed dogs of compositions embodying a salt of 1-cyclopentyl-2-methylaminopropane, and compositions embodying corresponding amounts of other known vasoconstrictor compounds is given in the table. In the table, for purposes of convenience the intravenous and oral potencies in pithed dogs of 1-cyclohexyl-2-methylaminopropane hydrochloride dissolved in physiological salt solution and water, respectively, were taken as standards and arbitrarily assigned the values of 100 percent. All of the other compositions were compared with this arbitrary standard. In the table, the first column lists the vasoconstrictive amine employed, the second column shows the comparative pressor response, expressed in percent, noted upon intravenous administration of a 1 percent aqueous solution of the composition under test, and the third column shows the comparative pressor response, in percent, upon oral administration by stomach tube of an aqueous solution of the substance under test.

TABLE

| Compounds | Comparative Pressor Response | |
|---|---|---|
| | Intravenous administration (percent of response) | Oral administration (percent of response) |
| 1-cyclohexyl-2-methylaminopropane hydrochloride | 100 | 100 |
| Do | 420 | 222 |
| 1-cyclopentyl-2-aminopropane hydrochloride | 218 | 164 |
| ephedrine sulfate | 254 | 197 |
| amphetamine sulfate | 334 | 87 |
| 2-aminoheptane sulfate | 230 | 58 |
| 2-amino-4-methylheptane sulfate | 250 | 46 |
| 1-cyclopentyl-2-aminoethane hydrochloride | 121 | 23 |

1-cyclopentyl-2-methylaminopropane is produced by processes of methylamination. Illustratively, cyclopentylacetone is methylaminated by a reductive amination with methylamine and a reducing means, or by reduction and methylamination of cyclopentylacetone, or by reduction and amination of cyclopentylacetone through a reduction to the carbinol and methylamination of a halide produced therefrom.

1-cyclopentyl-2-methylaminopropane is readily converted to its acid addition salts by treating it with the appropriate acid. Alternatively, salts of 1-cyclopentyl-2-methylaminopropane may be prepared by converting one salt of 1-cyclopentyl-2-methylaminopropane to a different salt by treatment with an appropriate acid or salt, and fractional crystallization to yield the desired amine salt.

Illustrative methods of preparing 1-cyclopentyl-2-methylaminopropane and its acid addition salts are given in the following examples:

EXAMPLE 1

*Preparation of 1-cyclopentyl-2-methylaminopropane*

1-cyclopentyl- 2 -methylaminopropane represented by the following formula:

may be prepared as follows:

A mixture of 75 g. (0.6 mol) of cyclopentylacetone, 75 g. (2.4 mols) of methylamine, and 10 g. of Raney nickel catalyst is placed in a high pressure bomb previously cooled to a temperature below —6° C., and hydrogen is admitted under an initial pressure of about 2000 pounds per square inch. The bomb is then heated to about 135–150° C. for about 2 hours, during which time reductive amination takes place and 1-cyclopentyl-2-methylaminopropane is produced. During the period of heating the reaction mixture is agitated by rocking the bomb. The bomb is then cooled and opened thus permitting the escape of hydrogen and most of the excess methylamine. The reaction mixture is filtered to remove the nickel catalyst and the filtrate comprising 1-cyclopentyl-2-methylaminopropane is purified by distillation under reduced pressure. 1-cyclopentyl-2-methylaminopropane boils at 83–86° C. at about 30 mm. pressure.

1-cyclopentyl-2-methylaminopropane thus produced is a colorless liquid of slightly ammoniacal odor. It has a refractive of $N_D^{25°}=1.4500$. Analysis showed the presence of 9.79 percent N as compared with a calculated value of 9.99 percent N.

For purposes of convenience, a preparation of cyclopentylacetone used in the preparation of 1-cyclopentyl- 2 -methylaminopropane is given below.

A mixture of 126 g. (1.5 mols) of cyclopentanone, 128 g. (1.5 mols) cyanoacetic acid, 31 g. (0.5 mol) of ammonium acetate and 200 cc. of dry benzene is heated under a refluxing condenser and a water trap. The mixture is refluxed for about 12 hours after which time no more water collects in the trap, and the formation of cyclopentylideneacetonitrile is complete. The reaction mixture comprising a mixture of cyclopentylideneacetonitrile and cyclopentylideneacetic acid is washed with about one liter of 1 percent hydrochloric acid and the benzene layer is separated and the mixture is distilled to cause decarboxylation of the cyclopentylideneacetic acid present. The distillate comprising cyclopentylideneacetonitrile which boils at 172-175° C. is purified by distillation.

A mixture of 53.5 g. (0.5 mol) of cyclopentylideneacetonitrile dissolved in 50 cc. of absolute ethanol and 0.5 g. of a palladium-carbon catalyst is hydrogenated with hydrogen at a pressure of about 40 pounds for about 3 hours. An additional amount of 0.8 g. of palladium carbon catalyst is then added and the hydrogenation continued for about 4 hours during which time the reduction is substantially completed and the cyclopentylideneacetonitrile is converted to cyclopentylacetonitrile. The reaction mixture is filtered to remove the catalyst and the alcohol is evaporated in vacuo. The residue comprising chiefly cyclopentylacetonitrile is washed with dilute hydrochloric acid to remove any amine which may have been formed during the hydrogenation process, and the organic residue comprising cyclopentylacetonitrile is dissolved in ether, the ether solution dried over anhydrous magnesium sulfate and distilled. The cyclopentylacetonitrile boils at 185–187° C. and has a refractive index of $N_D^{25°}=1.4456$.

To an ethereal solution of methyl magnesium iodide prepared from 26.7 g. (1.1 mols) of magnesium and 160 g. (1.13 mols) of methyliodide in 200 cc. of dry ether, is added a solution of 79 g. (0.72 mol) of cyclopentylacetonitrile in 100 cc. of dry ether. The reaction mixture is refluxed for four hours. The reaction mixture is then decomposed with ice in the usual way, and the ether layer containing the cyclopentylacetone is separated, is dried over anhydrous magnesium sulfate and the ether removed by evaporation. The residue comprising cyclopentylacetone is purified by distillation in vacuo. The cyclopentylacetone boils at 82–84° C. at about 32 mm. pressure.

EXAMPLE 2

1-cyclopentyl-2-methylaminopropane may also be prepared as follows:

To a solution of 5 g. of anhydrous methylamine in 500 cc. of dry ether, 10 g. of activated aluminum (i. e. aluminum treated with about 5 percent of mercuric chloride) are added and to the mixture there are added slowly 60 g. of cyclopentylacetone and 15 g. of water. The vigorous reaction which occurs upon the simultaneous addition of the cyclopentylacetone and water is controlled by external cooling of the reaction vessel. After the addition of the cyclopentylacetone and water is completed and the reaction has subsided the reaction mixture is filtered. From the filtrate the 1-cyclopentyl-2-methylaminopropane is extracted with dilute hydrochloric acid. The acid solution is then made basic with aqueous sodium hydroxide solution and the 1-cyclopentyl-2-methylaminopropane which appears as an oily layer is separated and purified by distillation.

EXAMPLE 3

1-cyclopentyl-2-methylaminopropane may also be prepared as follows:

A mixture of 40 g. of cyclopentylacetone, 20 g. of aluminum activated as described in Example 2, 200 cc. of ethanol and 20 cc. of 40 percent aqueous methylamine solution is heated on a steam bath with stirring for about 8 hours. The reaction mixture is filtered and the filtrate is evaporated to remove the ethanol. The residue comprising chiefly 1 - cyclopentyl - 2 - methylaminopropane is dissolved in dilute hydrochloric acid. The hydrochloric acid solution is extracted with ether to remove non-basic components and the acid solution is then made basic with sodium hydroxide solution, whereupon 1-cyclopentyl-2-methylaminopropane appears as an oily layer.

The oily 1-cyclopentyl-2-methylaminopropane is separated and purified by distillation.

EXAMPLE 4

1-cyclopentyl-2-methylaminopropane may also be prepared as follows:

A mixture of 32 g. of 1-cyclopentyl-2-aminopropane and 21 g. of benzaldehyde is heated on a steam bath for about one hour. The resulting Schiff's base is dissolved in benzene and the solution is dried with anhydrous magnesium sulfate. To the dried benzene solution are added 40 g. of methyliodide and the solution is heated in a pressure bottle at a temperature of about 80° C. for about 6 hours. The reaction mixture is then extracted with dilute hydrochloric acid to remove the 1-cyclopentyl-2-methylaminopropane. The 1-cyclopentyl-2-methylaminopropane is recovered in the usual way by treatment with alkali, separation of the oily 1-cyclopentyl-2-methylaminopropane and purification by distillation.

The 1-cyclopentyl-2-aminopropane used in the above reaction is prepared from cyclopentylacetone in the following manner:

A mixture of 50 g. of cyclopentylacetone, 20 g. of Raney nickel catalyst and 150 cc. of cold absolute ethanol saturated with anhydrous ammonia is shaken for 3 hours with hydrogen under a pressure of about 1500 pounds at a temperature of about 100° C. The reaction mixture is filtered to remove the catalyst and the filtrate is fractionally distilled to obtain 1-cyclopentyl-2-aminopropane in a substantially pure state. 1-cyclopentyl-2-aminopropane boils at 169–171° C.

EXAMPLE 5

1-cyclopentyl-2-methylaminopropane may also be prepared as follows:

A mixture of 50 g. of 1-cyclopentyl-2-aminopropane, 125 cc. of ethanol and about 30 cc. of 40 percent formaldehyde solution and 35 g. of activated aluminum is heated with stirring on a steam bath for about 8 hours. The reaction mixture is then filtered and the alcohol removed from the filtrate by evaporation. The residual liquid is diluted with ether and the ether solution containing the 1-cyclopentyl-2-methylaminopropane is washed several times with water and dried. The 1-cyclopentyl-2-methylaminopropane is obtained in substantially pure state by evaporating the ether from the solution and distilling the residue.

EXAMPLE 6

1-cyclopentyl-2-methylaminopropane may also be prepared as follows:

100 g. of cyclopentylacetone are hydrogenated with about 5 g. of Raney nickel and hydrogen at a hydrogen pressure of about 2000 pounds and a temperature of about 150° C. The reaction mixture is filtered to remove the catalyst and the filtrate which comprises 1-cyclopentyl-2-propanol is purified by distillation. The 1-cyclopentyl-2-propanol is converted into 1-cyclopentyl-2-bromopropane by adding to a solution of 75 g. of 1-cyclopentyl-2-propanol in 50 ml. of carbon tetrachloride a solution of 130 g. of thionyl bromide in 100 ml. of carbon tetrachloride, the addition being carried out slowly and the reaction mixture maintained ice cold. The reaction mixture is then allowed to warm to room temperature and to stand for about 1 hour. The reaction mixture is then washed with water to remove excess thionyl bromide and is distilled to recover the 1-cyclopentyl-2-bromopropane.

To a cold solution of 100 g. of 1-cyclopentyl-2-bromopropane in 200 cc. of ethanol are added 60 g. of methylamine and the mixture is heated to 90–100° C. under pressure for about 5 hours. The ethanol is removed by evaporation and the residue is treated with aqueous alkali whereupon 1-cyclopentyl-2-methylaminopropane appears as an oil. The oily 1-cyclopentyl-2-methylaminopropane is separated and purified by distillation.

EXAMPLE 7

Preparation of 1-cyclopentyl-2-methylaminopropane hydrochloride 1-cyclopentyl-2-methylaminopropane hydrochloride represented by the following formula

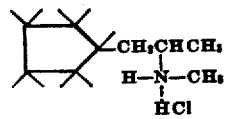

may be prepared as follows:

141 g. (1 mol) of 1-cyclopentyl-2-methylaminopropane are dissolved in 500 cc. of dry ether, and dry hydrogen chloride is passed into the solution until the weight of the mixture and container has increased by 36 g. During the addition of the hydrogen chloride, the hydrochloric acid addition salt of 1-cyclopentyl-2-methylaminopropane precipitates as a white powder. The salt is filtered off and washed with dry ether.

1-cyclopentyl-2-methylaminopropane hydrochloride thus prepared melts at about 113–115° C. The yield is practically quantitative.

EXAMPLE 8

Preparation of 1-cyclopentyl-2-methylaminopropane sulfate

A mixture of 70.5 g. (0.5 mol) of 1-cyclopentyl-2-methylaminopropane, 200 cc. of absolute ethanol and 250 cc. of 1 N sulfuric acid is evaporated to dryness on a steam bath. The resulting white solid comprising 1-cyclopentyl-2-methylaminopropane sulfate is powdered and washed successively with ether-ethanol mixture (1:1) and dry ether. The white sulfate is then dried at about 60° C. The yield is almost 100 percent of the amount theoretically obtainable.

EXAMPLE 9

Preparation of 1-cyclopentyl-2-methylaminopropane oleate

To a solution of 14.1 g. (0.1 mol) of 1-cyclopentyl-2-methylaminopropane in 150 cc. of dry ether are added 28.2 g. (0.1 mol) of oleic acid. The solution is evaporated in vacuo to remove the ether, leaving as an oily residue the 1-cyclopentyl-2-methylaminopropane oleate.

EXAMPLE 10

Preparation of 1-cyclopentyl-2-methylaminopropane carbonate 28.2 g. of dry 1-cyclopentyl-2-methylaminopropane are dissolved in 200 cc. of dry ether. The mixture is cooled to about 15° C. and carbon dioxide saturated with moisture is passed into the solution for a period of about 30 minutes whereupon 1-cyclopentyl-2-methylaminopropane carbonate is formed. The ether is removed by evaporation in vacuo at room temperature, yielding 1-cyclopentyl-2-methylaminopropane carbonate as a semi-solid residue which completely solidifies upon standing.

Other salts of 1-cyclopentyl-2-methylaminopropane may likewise be prepared by reacting 1-cyclopentyl-2-methylaminopropane with the desired acid conveniently in the presence of an inert solvent. For example, 1-cyclopentyl-2-methylaminopropane n-hexylsulfonate may be produced by reacting 1-cyclopentyl-2-methylaminopropane in a suitable solvent such as ethanol with n-hexylsulfonic acid. Similarly, 1-cyclopentyl-2-methylaminopropane dissolved in a suitable solvent may be reacted with malic acid, benzoic acid, glycolic acid, nicotinic acid, maleic acid, gluconic acid, phosphoric acid, succinic acid and the like, to form the corresponding acid addition salts of 1-cyclopentyl-2-methylaminopropane.

I claim:

1. A composition comprising a member of the group consisting of 1-cyclopentyl-2-methylaminopropane and acid addition salts thereof, dispersed in a physiologically compatible extending medium.

2. A composition comprising a member of the group consisting of 1-cyclopentyl-2-methylaminopropane and acid addition salts thereof, dispersed in effective amounts up to about five percent in a liquid physiologically compatible extending medium.

3. A composition comprising an acid addition salt of 1-cyclopentyl-2-methylaminopropane dissolved in an aqueous physiologically compatible extending medium.

4. A composition according to claim 3 in which the acid addition salt of 1-cyclopentyl-2-methylaminopropane is present in a concentration of about one half to about two percent on a weight-volume basis.

5. A composition comprising an acid addition salt of 1-cyclopentyl-2-methylaminopropane dissolved in water in a concentration of about one half to about two percent on a weight-volume basis.

6. A composition comprising an aqueous substantially isotonic solution of 1-cyclopentyl-2-methylaminopropane hydrochloride.

7. A composition comprising a water solution of 1-cyclopentyl-2-methylaminopropane in a concentration of about one percent on a weight-volume basis.

8. A member of the group consisting of 1-cyclopentyl-2-methylaminopropane and acid addition salts thereof.

9. Acid addition salts of 1-cyclopentyl-2-methylaminopropane.

10. 1-cyclopentyl-2-methylaminopropane hydrochloride.

11. 1-cyclopentyl-2-methylaminopropane sulfate.

12. A carbon dioxide addition salt of 1-cyclopentyl-2-methylaminopropane.

EWALD ROHRMANN.

REFERENCES CITED

The following references are of record in the file of this patent:

UNITED STATES PATENTS

| Number | Name | Date |
|---|---|---|
| 2,369,711 | Blythe | Feb. 20, 1945 |

OTHER REFERENCES

Beyer: Physiological Reviews, vol. 26, No. 2, April 1946, pages 169 to 197 (page 191 relied upon).

Gutman: Modern Drug Encyclopedia, pages 557, 554, 493, 494, Yorke Publishing Co., 1946.

V. Braun et al.: "Ber. Deut. Chem.," vol. 66, pages 1373–1378.

Blicke et al.: "J. Am. Chem. Soc.," vol. 61, pages 91–93 (1939).

Lands et al.: "Chemical Abstracts," vol. 39, page 4150.